United States Patent
Sharma et al.

(10) Patent No.: US 9,501,649 B2
(45) Date of Patent: Nov. 22, 2016

(54) SYSTEMS AND METHODS FOR DETERMINING POTENTIAL IMPACTS OF APPLICATIONS ON THE SECURITY OF COMPUTING SYSTEMS

(71) Applicant: Symantec Corporation, Mountain View, CA (US)

(72) Inventors: Piyush Sharma, Maharashtra (IN); Peter Ashley, Hopkinton, MA (US)

(73) Assignee: Symantec Corporation, Mountain View, CA (US)

( * ) Notice: Subject to any disclaimer, the term of this patent is extended or adjusted under 35 U.S.C. 154(b) by 98 days.

(21) Appl. No.: 13/838,613

(22) Filed: Mar. 15, 2013

(65) Prior Publication Data

US 2014/0283082 A1    Sep. 18, 2014

(51) Int. Cl.
*G06F 21/57*    (2013.01)

(52) U.S. Cl.
CPC .................... *G06F 21/577* (2013.01)

(58) Field of Classification Search
CPC ............... G06F 21/56; G06F 21/51; G06F 21/577; H04L 63/145
See application file for complete search history.

(56) References Cited

U.S. PATENT DOCUMENTS

| | | | |
|---|---|---|---|
| 7,730,040 B2 * | 6/2010 | Reasor et al. | 707/690 |
| 7,904,962 B1 * | 3/2011 | Jajodia | H04L 63/1425 726/24 |
| 7,966,278 B1 | 6/2011 | Satish | |
| 8,255,902 B1 | 8/2012 | Satish | |
| 8,505,069 B1 * | 8/2013 | Solodovnikov | G06F 8/65 709/224 |
| 8,627,475 B2 * | 1/2014 | Loveland | G06F 21/552 726/24 |

(Continued)

OTHER PUBLICATIONS

Sourabh Satish; Systems and Methods for Determining and Quantifying the Impact of an Application on the Health of a System; U.S. Appl. No. 13/558,570, filed Jul. 26, 2012.

(Continued)

*Primary Examiner* — Chau Le
*Assistant Examiner* — Muhammad Chaudhry
(74) *Attorney, Agent, or Firm* — ALG Intellectual Property, LLC

(57) ABSTRACT

A computer-implemented method for determining potential impacts of applications on the security of computing systems may include (1) identifying an application subject to a security vulnerability assessment, (2) requesting information that identifies a potential impact of the application on a vulnerability of at least one computing system to at least one exploit associated with the application, (3) receiving the information that identifies the potential impact of the application on the vulnerability of the computing system, wherein the information may be derived at least in part from data from at least one additional computing system on which the application has previously been installed and (4) directing a determination about an installation of the application on the computing system based at least in part on the information that identifies the potential impact of the application on the vulnerability of the computing system. Various other methods, systems, and computer-readable media are also disclosed.

20 Claims, 6 Drawing Sheets

(56) References Cited

U.S. PATENT DOCUMENTS

| | | | | |
|---|---|---|---|---|
| 8,990,934 | B2* | 3/2015 | Pavlyushchik | G06F 21/00 726/22 |
| 9,104,870 | B1* | 8/2015 | Qu | G06F 21/563 |
| 9,117,079 | B1* | 8/2015 | Huang | G06F 21/566 |
| 2004/0045012 | A1* | 3/2004 | Doraisamy | 717/170 |
| 2004/0230967 | A1* | 11/2004 | Yuknewicz et al. | 717/170 |
| 2005/0283622 | A1 | 12/2005 | Hall et al. | |
| 2011/0041124 | A1* | 2/2011 | Fishman | G06F 8/63 717/170 |
| 2012/0079596 | A1* | 3/2012 | Thomas | G06F 21/55 726/24 |
| 2012/0255019 | A1* | 10/2012 | McNamee | G06F 21/554 726/24 |
| 2013/0061326 | A1* | 3/2013 | Bennett | H04L 63/145 726/24 |
| 2013/0074186 | A1* | 3/2013 | Muttik | 726/24 |
| 2013/0247205 | A1* | 9/2013 | Schrecker | G06F 21/577 726/25 |

OTHER PUBLICATIONS

Symantec Corporation; Data Sharing—Worldwide Intelligence Network Environment; http://www.symantec.com/about/profile/universityresearch/sharing.jsp, as accessed Jan. 29, 2013.

Tudor Dumitras, et al.; Toward a Standard Benchmark for Computer Security Research: The Worldwide Intelligence Network Environment (WINE); In EuroSys BADGERS '11 Workshop; Apr. 10, 2011; available at http://users.ece.cmu.edu/~tdumitra/public_documents/dumitras11wine.pdf; Salzburg, Austria.

Tudor Dumitras, et al.; Ask WINE: Are We Safer Today? Evaluating Operating System Security through Big Data Analysis; In USENIX Workshop on Large-Scale Exploits and Emerging Threats (LEET); Apr. 24, 2012.

Tudor Dumitras, et al.; Systems and Methods for Determining Malicious-Attack Exposure Levels Based on Field-Data Analysis; U.S. Appl. No. 13/866,724, filed Apr. 19, 2013.

\* cited by examiner

SYSTEMS AND METHODS FOR DETERMINING POTENTIAL IMPACTS OF APPLICATIONS ON THE SECURITY OF COMPUTING SYSTEMS

BACKGROUND

Many thousands of computer programs and applications are available for installation on modern-day computing devices, such as the personal computer. Unfortunately, a user of a computing device may be unable to determine whether an application will impact the security (e.g., the vulnerability to malware and other exploits) of the computing device when deciding whether to install, update, or keep the application on the computing device.

Users may turn to security vendors for information on how an application may impact the security of a computing device. Unfortunately, security vendors may not always discover exploits in applications before malicious actors do, leaving users vulnerable to zero-day exploits. On the other hand, some potential exploits in applications may be mostly theoretical and pose little actual threat to computer security. In these cases, users may not always wish to remove these applications.

In the absence of reliable information, users may not learn of the negative impact of an application until after a vulnerability caused by the application has already been exploited. Unfortunately, in some instances the negative effects of an application on a computing device may not be easily reversible.

Accordingly, the instant disclosure identifies and addresses a need for additional and improved systems and methods for determining potential impacts of applications on the security of computing systems.

SUMMARY

As will be described in greater detail below, the instant disclosure generally relates to systems and methods for determining potential impacts of applications on the security of computing systems based on observed correlations between computing system components (e.g., including applications) and computing system events that reflect potential computing system vulnerabilities.

In one example, a computer-implemented method for determining potential impacts of applications on the security of computing systems may include (1) identifying an application subject to a security vulnerability assessment, (2) requesting information that identifies a potential impact of the application on a vulnerability of at least one computing system to at least one exploit associated with the application, (3) receiving the information that identifies the potential impact of the application on the vulnerability of the computing system, wherein the information may be derived at least in part from data from at least one additional computing system on which the application has previously been installed and (4) directing a determination about an installation of the application on the computing system based at least in part on the information that identifies the potential impact of the application on the vulnerability of the computing system.

In one embodiment, the data from the additional computing system may include (1) information describing at least one component of the additional computing system and (2) information describing at least one event on the additional computing system that may indicate the exploit associated with the application.

In one embodiment, (1) requesting the information that identifies the potential impact of the application on the vulnerability of the computing system may include submitting information about at least one component of the computing system and (2) the information may be derived at least in part from the component of the computing system matching a component of the additional computing system.

In one embodiment, the information may be derived at least in part from a statistical analysis correlating at least one component of the computing system with at least one event on the additional computing system that may indicate the exploit associated with the application in combination with at least one matching component of the additional computing system that may match the component of the computing system.

In some examples, directing the determination about the installation of the application on the computing system may include (1) determining, based on the information, that the application will create the vulnerability on the computing system if installed on the computing system and (2) blocking the installation of the application based at least in part on determining that the application will create the vulnerability.

In one embodiment, the installation of the application may include an update of a previous version of the application to a newer version of the application and directing the determination about the installation of the application on the computing system may include blocking the update of the previous version of the application on the computing system to the newer version of the application.

In one embodiment, the application may be installed on the computing system and directing the determination about the installation of the application on the computing system may include (1) determining that removing the application from the computing system will contribute to removing the vulnerability from the computing system and (2) removing the application from the computing system based on determining that removing the application from the computing system will contribute to removing the vulnerability from the computing system.

In some examples, directing the determination about the installation of the application on the computing system may include (1) identifying an attempt to install the application on the computing system, (2) notifying a user of the potential impact of the application on the vulnerability of the computing system and (3) receiving input from the user regarding whether to install the application on the computing system.

In one embodiment, (1) the application may be installed on the computing system and (2) directing the determination about the installation of the application on the computing system may include (i) notifying a user of the potential impact of the application on the vulnerability of the computing system and (ii) receiving input from the user regarding whether to remove the application from the computing system.

In one embodiment, a system for implementing the above-described method may include (1) an identification module programmed to identify an application subject to a security vulnerability assessment, (2) a requesting module programmed to request information that identifies a potential impact of the application on a vulnerability of at least one computing system to at least one exploit associated with the application, (3) a receiving module programmed to receive the information that identifies the potential impact of the application on the vulnerability of the computing system, wherein the information may be derived at least in part from data from at least one additional computing system on which the application has previously been installed, (4) a direction module programmed to direct a determination about an installation of the application on the computing system based at least in part on the information that identifies the potential impact of the application on the vulnerability of the computing system and (5) at least one processor configured to execute the identification module, the requesting module, the receiving module and the direction module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify an application subject to a security vulnerability assessment, (2) request information that identifies a potential impact of the application on a vulnerability of at least one computing system to at least one exploit associated with the application, (3) receive the information that identifies the potential impact of the application on the vulnerability of the computing system, wherein the information may be derived at least in part from data from at least one additional computing system on which the application has previously been installed and (4) direct a determination about an installation of the application on the computing system based at least in part on the information that identifies the potential impact of the application on the vulnerability of the computing system.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
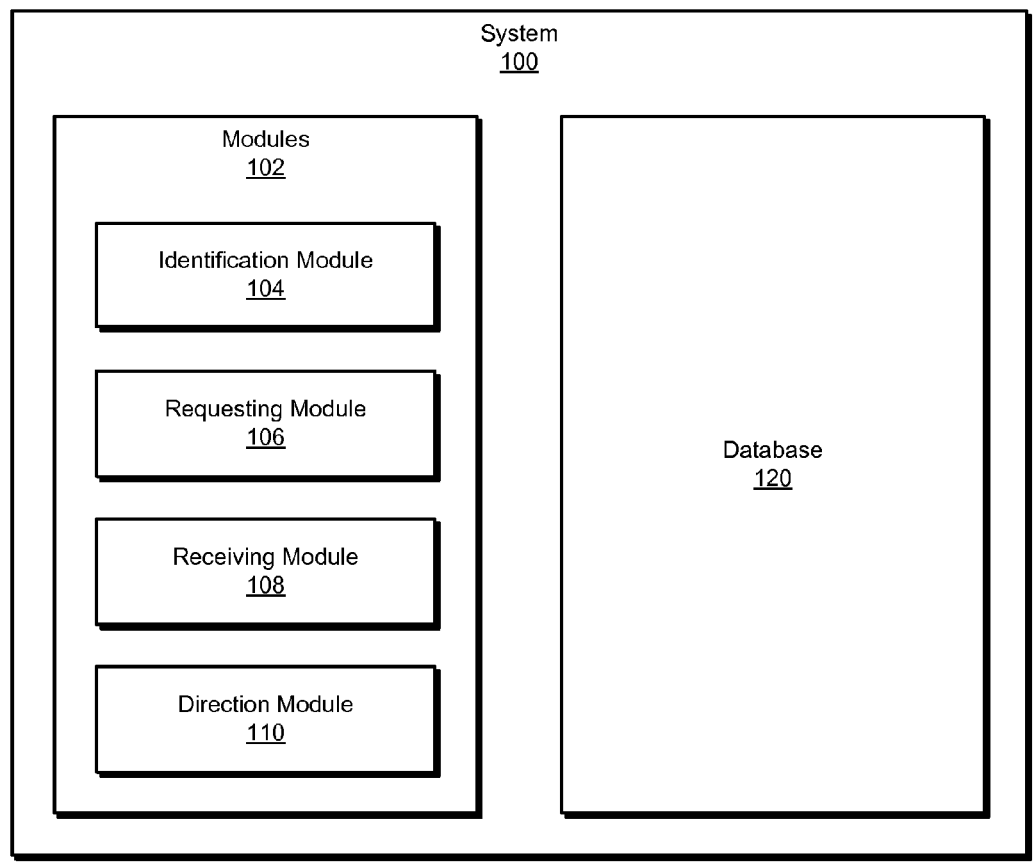
FIG. 1 is a block diagram of an exemplary system for determining potential impacts of applications on the security of computing systems.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for determining potential impacts of applications on the security of computing systems. As will be explained in greater detail below, by determining potential impacts of applications on the security of computing systems based on observed correlations between computing system components (e.g., including applications) and computing system events that reflect potential computing system vulnerabilities, the systems and methods described herein may enable users to make installation decisions about applications (e.g., whether to install, update, and/or remove applications) using information obtained from additional computing systems (potentially millions) on which the applications have previously been installed. These systems and methods may thereby provide protection against zero-day exploits. Additionally, in some examples these systems and methods may assist security vendors and/or researchers in identifying and analyzing new exploits. Furthermore, in some examples these systems and methods may help users to make informed decisions to keep applications installed that do not pose significant risks despite existing exploits.

Figure 2:
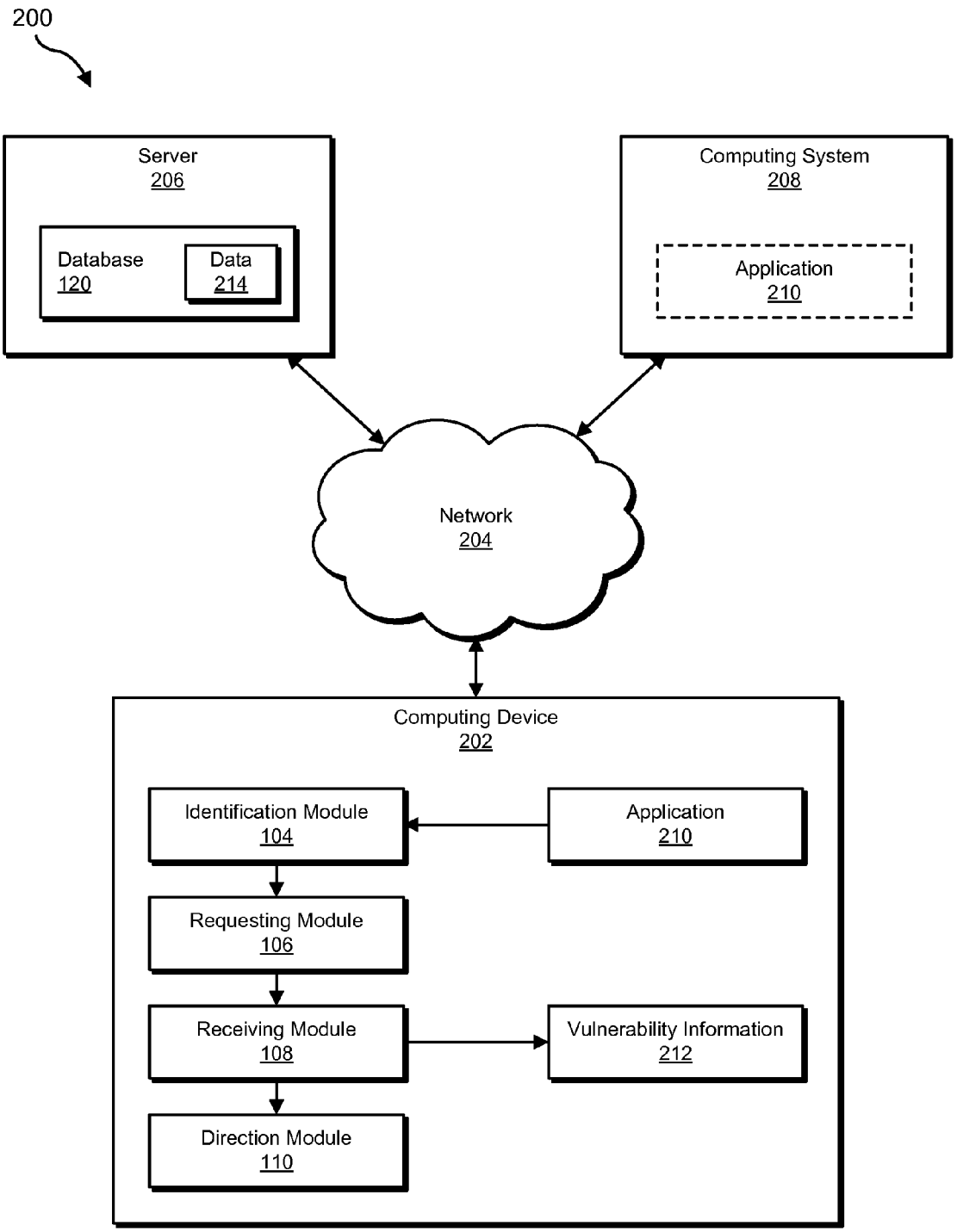
FIG. 2 is a block diagram of an exemplary system for determining potential impacts of applications on the security of computing systems.
Figure 3:
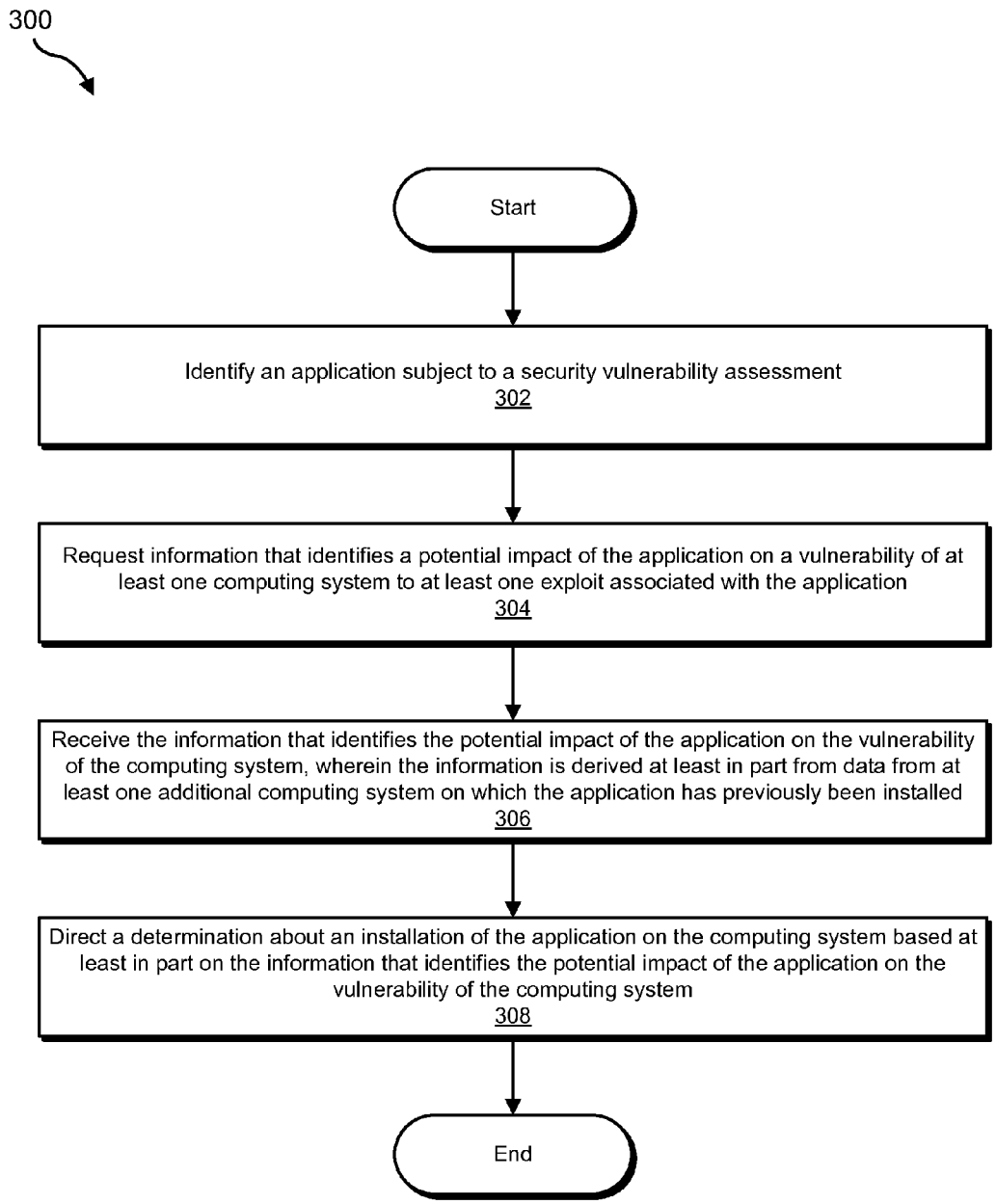
FIG. 3 is a flow diagram of an exemplary method for determining potential impacts of applications on the security of computing systems.
Figure 4:
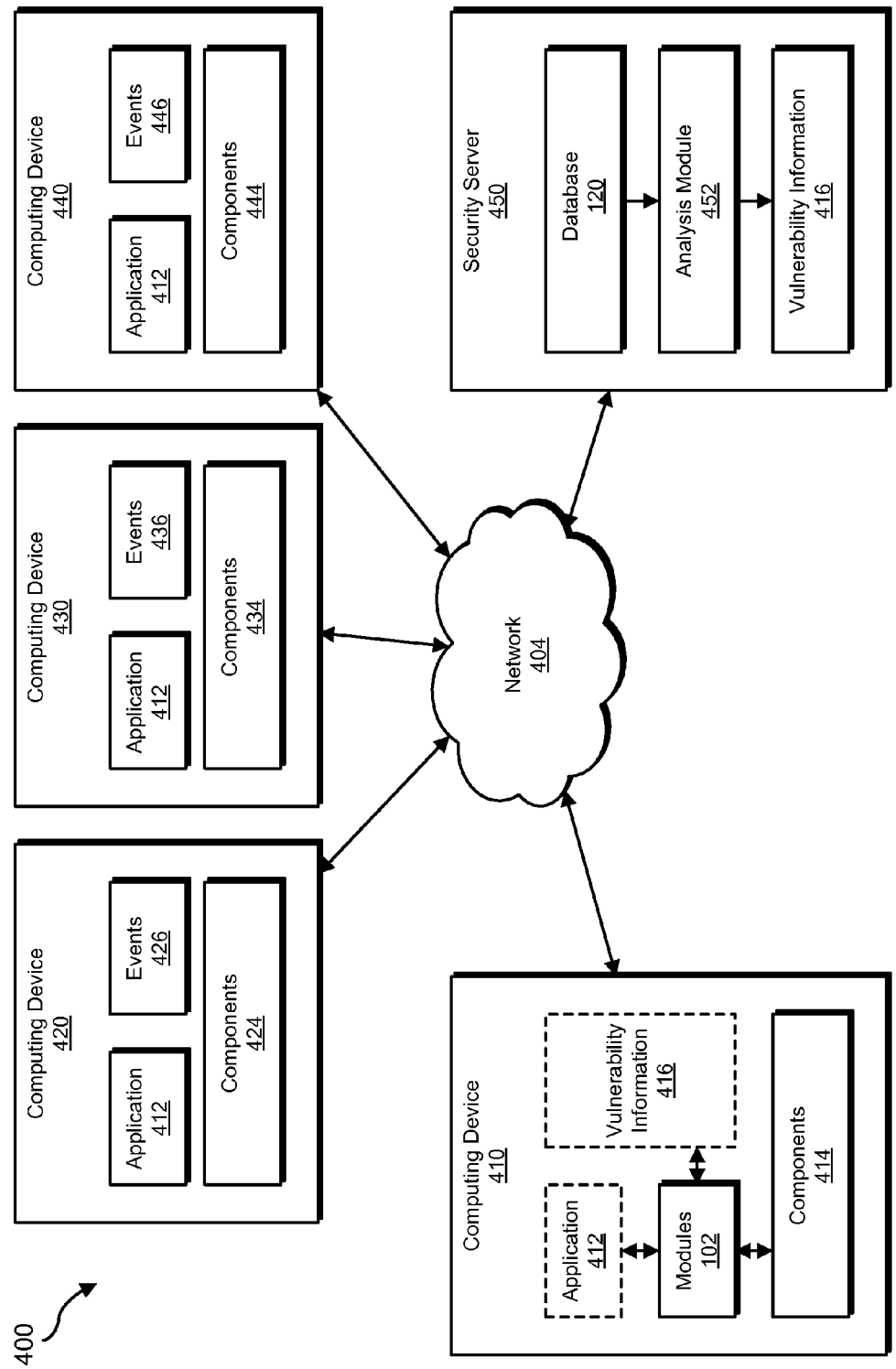
FIG. 4 is a block diagram of an exemplary system for determining potential impacts of applications on the security of computing systems.

The following will provide, with reference to FIGS. 1, 2, and 4, detailed descriptions of exemplary systems for determining potential impacts of applications on the security of computing systems. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of exemplary system 100 for determining potential impacts of applications on the security of computing systems. As illustrated in this figure, exemplary system 100 may include one or more modules 102 for performing one or more tasks. For example, and as will be explained in greater detail below, exemplary system 100 may also include an identification module 104 programmed to identify an application subject to a security vulnerability assessment. Exemplary system 100 may additionally include a requesting module 106 programmed to request information that identifies a potential impact of the application on a vulnerability of at least one computing system to at least one exploit associated with the application. Exemplary system 100 may also include a receiving module 108 programmed to receive the information that identifies the potential impact of the application on the vulnerability of the computing system, wherein the information is derived at least in part from data from at least one additional computing system on which the application has previously been installed. Exemplary system 100 may additionally include a direction module 110 programmed to direct a determination about an installation of the application on the computing system based at least in part on the information that identifies the potential impact of the application on the vulnerability of the computing system. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store information relating to application vulnerabilities and/or exploits. For example, database 120 may be configured to store information about computing systems on which applications have been previously installed, including, e.g., components of the computing systems and events relating to vulnerabilities and/or exploits on the computing systems.

Database 120 may represent portions of a single database or computing device or a plurality of databases or computing devices. For example, database 120 may represent a portion of server 206 in FIG. 2, computing system 510 in FIG. 5, and/or portions of exemplary network architecture 600 in FIG. 6. Alternatively, database 120 in FIG. 1 may represent one or more physically separate devices capable of being accessed by a computing device, such as server 206 in FIG. 2, computing system 510 in FIG. 5, and/or portions of exemplary network architecture 600 in FIG. 6.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. Computing device 202 may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of computing device 202 and/or server 206, facilitate computing device 202 and/or server 206 in determining potential impacts of applications on the security of computing systems. For example, and as will be described in greater detail below, one or more of modules 102 may cause computing device 202 and/or server 206 to determine potential impacts of applications on the security of computing systems. For example, and as will be described in greater detail below, identification module 104 may be programmed to identify an application 210 subject to a security vulnerability assessment. Requesting module 106 may be programmed to request vulnerability information 212 that identifies a potential impact of application 210 on a vulnerability of computing device 202 to at least one exploit associated with application 210. Receiving module 108 may be programmed to receive vulnerability information 212 that identifies the potential impact of application 210 on the vulnerability of computing device 202. The information may be derived at least in part from data 214 from an additional computing system 208 on which application 210 has previously been installed. Direction module 110 may be programmed to direct a determination about an installation of application 210 on computing device 202 based at least in part on vulnerability information 212 that identifies the potential impact of application 210 on the vulnerability of computing device 202.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, combinations of one or more of the same, exemplary computing system 510 in FIG. 5, or any other suitable computing device.

Server 206 generally represents any type or form of computing device that is capable of storing, analyzing, and/or providing information relating to vulnerabilities and/or exploits associated with applications. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Storage Area Network (SAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections. In one embodiment, network 204 may facilitate communication between computing device 202 and server 206.

FIG. 3 is a flow diagram of an exemplary computer-implemented method 300 for determining potential impacts of applications on the security of computing systems. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify an application subject to a security vulnerability assessment. For example, at step 302 identification module 104 may, as part of computing device 202 in FIG. 2, identify an application 210 subject to a security vulnerability assessment.

As used herein, the term "application" may refer to any application, application package, program, driver, module, script, daemon, software component, software update, and/or process that may execute on a computing system.

As used herein, the phrase "security vulnerability assessment" may refer to any assessment regarding how an application may impact the security of a computing system by introducing one or more vulnerabilities to the computing system and/or increasing the risk of one or more exploits being performed against the computing system (e.g., via the application). For example, the phrase "security vulnerability assessment" may include an assessment of how an application may allow a computing system to be exploited by and/or introduced to malware. In another example, the phrase "security vulnerability assessment" may include an assessment of how an application may leave a computing system open to an intrusion attempt. In some example, the phrase "security vulnerability assessment" may include an assessment of how an application may cause an instability in the computing system and/or interfere with one or more components of the computing system that may create a vulnerability in the computing system.

Identification module 104 may identify the application in any of a variety of contexts. For example, identification module 104 may identify an attempt to install the application on a computing system. In some examples, identification module 104 may identify a download of the application to the computing system. In some examples, identification module 104 may identify a recent installation of the application on the computing system. In some examples, identification module 104 may identify an update to a previous version of the application available to the computing system. In some examples, identification module 104 may identify an attempted update to a previous version of the application on the computing system. In some examples, identification module 104 may identify a list of applications installed on the computing system. Additionally or alternatively, identification module 104 may identify the application by scanning the computing system for applications and/or a program for installing applications. For example, identification module 104 may detect a new application on the computing system by file type (e.g., MSI) and/or by name (e.g., setup.exe or install.exe).

In some examples, identification module 104 may identify the application by identifying one or more files and/or system changes resulting from and/or associated with installing the application. For example, identification module 104 may identify one or more shared and/or non-shared program files created and/or modified by the application, one or more folders and/or directories created and/or modified by the application, one or more registry entries created and/or modified by the application, one or more configuration file entries created and/or modified by the application, one or more environment variables created and/or modified by the application, and/or one or more links and/or shortcuts created by the application.

In addition, in some examples one or more of the files and/or system changes associated with and/or that result from installing the application may, after being identified, be associated with a single identifier of the application. For example, identification module 104 may, after identifying one or more files and/or system changes associated with or that result from installing the application "MYPROG," associate these files and/or system changes with the installation file "myprog_setup.exe" for the application "MYPROG." In certain embodiments, such an association may the systems described herein to accurately determine the impact of a single application on the health of a system, even if installation of the single application results in the creation of numerous files and/or system changes.

In some examples, identification module 104 may identify the application from the context of a security server. For example, identification module 104 may receive a request from a client system (e.g., before allowing an installation of the application on the client system) to respond with information regarding whether the application is safe to install and/or whether installing the application will create a vulnerability on the client system. Similarly, the client system may send a request regarding potential vulnerabilities created by an application already installed on the client system and/or potential vulnerabilities that an update to a previous version of the application already installed on the computing system may create.

In some examples, identification module 104 may identify the application in the context of application security research. For example, identification module 104 may identify the application from a list of applications that are installed on a set of computing systems contributing information for security research (e.g., contributing information as a part of using security software from a security vendor). Additionally or alternatively, identification module 104 may identify the application by finding the application listed in an application store and/or other source for downloading and installing applications.

FIG. 4 is an illustration of an exemplary system 400 for determining potential impacts of applications on the security of computing systems. As shown in FIG. 4, exemplary system 400 may include a computing device 410, computing devices 420, 430, and 440, and a security server 450 connected to a network 404. Using FIG. 4 as an example, at step 302 identification module 104 may, as a part of computing device 410, identify an application 412 at computing device 410.

Returning to FIG. 3, at step 304 one or more of the systems described herein may request information that identifies a potential impact of the application on a vulnerability of at least one computing system to at least one exploit associated with the application. For example, at step 304 requesting module 106 may, as part of computing device 202 in FIG. 2, request vulnerability information 212 that identifies a potential impact of application 210 on a vulnerability of computing device 202 to at least one exploit associated with application 210.

Requesting module 106 may request information that identifies the potential impact of the application by sending any of a variety of information about the application and/or the computing system. For example, requesting module 106 may request the information by submitting information about one or more components of the computing system. As used herein, the term "component" may refer to any hardware and/or software component of a computing system. Examples of components may include processors, memory devices, networking devices, storage devices, input/output devices, operating systems, dynamic-link libraries, Basic Input/Output Systems ("BIOS"), drivers, services, and/or applications.

As will be explained in greater detail below, in some examples, the information requested by requesting module 106 may be derived at least in part from the component of the computing system matching a component of one or more additional computing systems. For example, the information may be derived at least in part from a statistical analysis correlating one or more components of the computing system with at least one event on one or more additional computing systems that may indicate the exploit associated with the application in combination with one or more matching component of the additional computing systems that may match the component of the computing system.

As used herein, the term "event" may refer to any behavior and/or event that may be observed on a computing system and which may result from, indicate, and/or correlate with a vulnerability on the computing system and/or an exploit of a vulnerability on the computing system. Examples of events may include malware infections, system intrusions, indicia of malware infections and/or system intrusions, system restarts, system crashes, software exceptions, system errors, and system warnings.

In some examples, the information may be derived from observations of events across one or more computing systems over time (e.g., before and after the application is installed, updated, and/or removed on the computing systems).

Requesting module 106 may requesting the information in any of a variety of contexts. For example, requesting module 106 may request the information by sending a request to a security server. Additionally or alternatively, requesting module 106 may request the information by querying a database for the information.

Using FIG. 4 as an example, at step 304 requesting module 106 may, as a part of computing device 410, request vulnerability information 416 about application 412 from security server 450. For example, computing device 410 may send an identification of application 412 (e.g., a name of application 412, a hash of application 412, a digital signature of application 412, etc.) and information about components 414 of computing device 410 (e.g., the processor architecture of computing device 410, the operating system version of computing device 410, drivers installed on computing device 410, etc.).

Returning to FIG. 3, at step 306 one or more of the systems described herein may receive the information that identifies the potential impact of the application on the vulnerability of the computing system, wherein the information is derived at least in part from data from at least one additional computing system on which the application has previously been installed. For example, at step 306 receiving module 108 may, as part of computing device 202 in FIG. 2, receive vulnerability information 212 that identifies the potential impact of application 210 on the vulnerability of computing device 202, where the information is derived at least in part from data 214 from additional computing system 208 on which application 210 has previously been installed.

The data from the additional computing system may include any of a variety of data. For example, the data may include information describing one or more components of the additional computing system and/or information describing one or more events on the additional computing system that indicate the exploit associated with the application.

Using FIG. 4 as an example, computing devices 420, 430, and 440 may each have had application 412 installed. In this example, computing devices 420, 430, and 440 may send information about their respective installations of application 412 as well as their respective components and events observed on the computing devices to security server 450 to add to database 120. For example, computing device 420 may submit information about components 424 of computing device 420 and events 426 observed on computing device 420 to security server 450. Likewise, computing device 430 may submit information about components 434 of computing device 430 and events 436 observed on computing device 430 to security server 450, and computing device 440 may submit information about components 444 of computing device 440 and events 446 observed on computing device 440 to security server 450. Security server 450 may collect the submissions of computing devices 420, 430, and 440 over time and add these submissions to database 120. In some examples, an analysis module 452 may then analyze database 120 to identify correlations between application 412, components 424, 434, and 444, and events 426, 436, and 446. In these examples, computing device 410 may receive vulnerability information 416 relating to application 412 and components 414 generated by analysis module 452. In some examples, analysis module 452 may receive the request from computing device 410 and then analyze database 120 in light of the request from computing device 410 (e.g., pertaining to application 412 and including information about components 414 of computing device 410). Analysis module 452 may analyze database 120 in any suitable manner. For example, analysis module 452 may perform a statistical analysis of database 120 to identify how application 412 is correlated with various events indicating vulnerabilities in the context of various components.

Returning to FIG. 3, at step 308 one or more of the systems described herein may direct a determination about an installation of the application on the computing system based at least in part on the information that identifies the potential impact of the application on the vulnerability of the computing system. For example, at step 308 direction module 110 may, as part of computing device 202 in FIG. 2, direct a determination about an installation of application 210 on computing device 202 based at least in part on vulnerability information 212 that identifies the potential impact of application 210 on the vulnerability of computing device 202.

Direction module 110 may direct the determinations about the installation of the application in any of a variety of ways. In some examples, direction module 110 may direct the determination about the installation of the application on the computing system by (1) determining, based on the information, that the application will create the vulnerability on the computing system if installed on the computing system and (2) blocking the installation of the application based at least in part on determining that the application will create the vulnerability. In some examples, direction module 110 may quarantine the application upon the installation of the application. Additionally or alternatively, direction module 110 may install the application in a virtualization layer to protect the computing system against the vulnerability.

In some examples, the installation of the application may include an update of a previous version of the application to a newer version of the application. In these examples, direction module 110 may direct the determination about the installation of the application on the computing system by blocking the update of the previous version of the application on the computing system to the newer version of the application. Additionally or alternatively, direction module 110 may prevent an automatic update of the application (e.g., that was otherwise configured for automatic updates).

In some examples, the application may be installed on the computing system. In these examples, directing the determination about the installation of the application on the computing system may include (1) determining that removing the application from the computing system will contribute to removing the vulnerability from the computing system and (2) removing the application from the computing system based on determining that removing the application from the computing system will contribute to removing the vulnerability from the computing system. For example, direction module 110 may uninstall the application from the computing system. Additionally or alternatively, direction module 110 may delete the application from the computing system. In some examples, direction module 110 may quarantine the application on the computing system and/or move the application to a virtualization layer on the computing system.

In some examples, direction module 110 may direct the determination about the installation of the application on the computing system by (1) identifying an attempt to install the application on the computing system, (2) notifying a user of the potential impact of the application on the vulnerability of the computing system and (3) receiving input from the user regarding whether to install the application on the computing system. Direction module 110 may then install (or not install) the application according to the user input. In some examples, direction module 110 may notify the user of the nature of the potential impact and/or the nature of the vulnerability. For example, direction module 110 may notify the user of one or more malware variants known to exploit the vulnerability, one or more potential consequences of the exploitation of the vulnerability, and/or an assessment of the probability that the vulnerability will be exploited in light of the components of the computing system. In some examples, direction module 110 may notify the user of the potential impact of the application in other contexts. For example, direction module 110 may notify the user of the potential impact of the application when the user browses to the application within an application store.

In some examples, the application may be installed on the computing system. In these examples, direction module 110 may direct the determination about the installation of the application on the computing system by (1) notifying a user of the potential impact of the application on the vulnerability of the computing system and (2) receiving input from the user regarding whether to remove the application from the computing system. Direction module 110 may then remove the application (or leave the application installed) based on the user input.

In some examples, direction module 110 may direct the determination about the installation of the application on the computing system by determining, in any of a variety of contexts, that installing the application on the computing system would create the vulnerability on the computing system. For example, direction module 110 may operate as a part of a security research system assessing the potential impact of the application across a population of computing systems. In this example, direction module 110 may use a profile of the computing system (e.g., based on the components of the computing system) as a sample and determine that the installation of the application would create the vulnerability on the computing system. Direction module 110 may further determine what proportion of the population of computing systems would be affected by the installation. For example, direction module 110 may determine that 30% of the population of computing systems, including the computing system, would be vulnerable to an exploit if the application were installed.

In some examples, one or more of the systems described herein may operate within an enterprise context. For example, an administrator may wish to know the potential impact of applications deployed on computing systems within an organization on the vulnerability of the computing systems. For example, direction module 110 may direct a determination about the installation of the application on one or more computing systems by determining that the application is associated with exploit-related activity. Direction module 110 may then notify the administrator that the application poses a security risk and/or that the computing systems within the organization on which the application is installed pose a security risk. In some examples, these systems may inspect a gold image which may form the basis for multiple installations and/or virtual machines. In these examples, direction module 110 may notify the administrator that one or more applications within the gold image would have a potential impact on the vulnerability of one or more computing systems onto which the gold image is deployed.

As explained above in connection with method 300 in FIG. 3, an application may be available for installation on, be available for an update on, and/or be installed and under consideration for removal from a computing system. The computing system may request information about vulnerabilities that the application may create on the computing system (e.g., opening the computing system to malware infections, system intrusions, etc.). The request may include information about the application and the computing system (e.g., components of the computing system that may impact the possibility and/or probability of the application causing a vulnerability). The request may be directed to a database and/or system that has received information from many other computing systems that have and/or have had the application installed, including information about the components of these computing systems and events that have been observed on the computing system that may include evidence of vulnerabilities and/or exploits of vulnerabilities on the computing systems. This database and/or system may then analyze and/or correlate the data (before and/or after receiving the request from the computing system for information about the application) to determine which vulnerabilities arise from the application in the context of which combinations of components. Then, based on the components of the computing system, this database and/or system may provide vulnerability information specific to the computing system, which may be used in determinations regarding the disposition of the application on the computing system.

Figure 5:
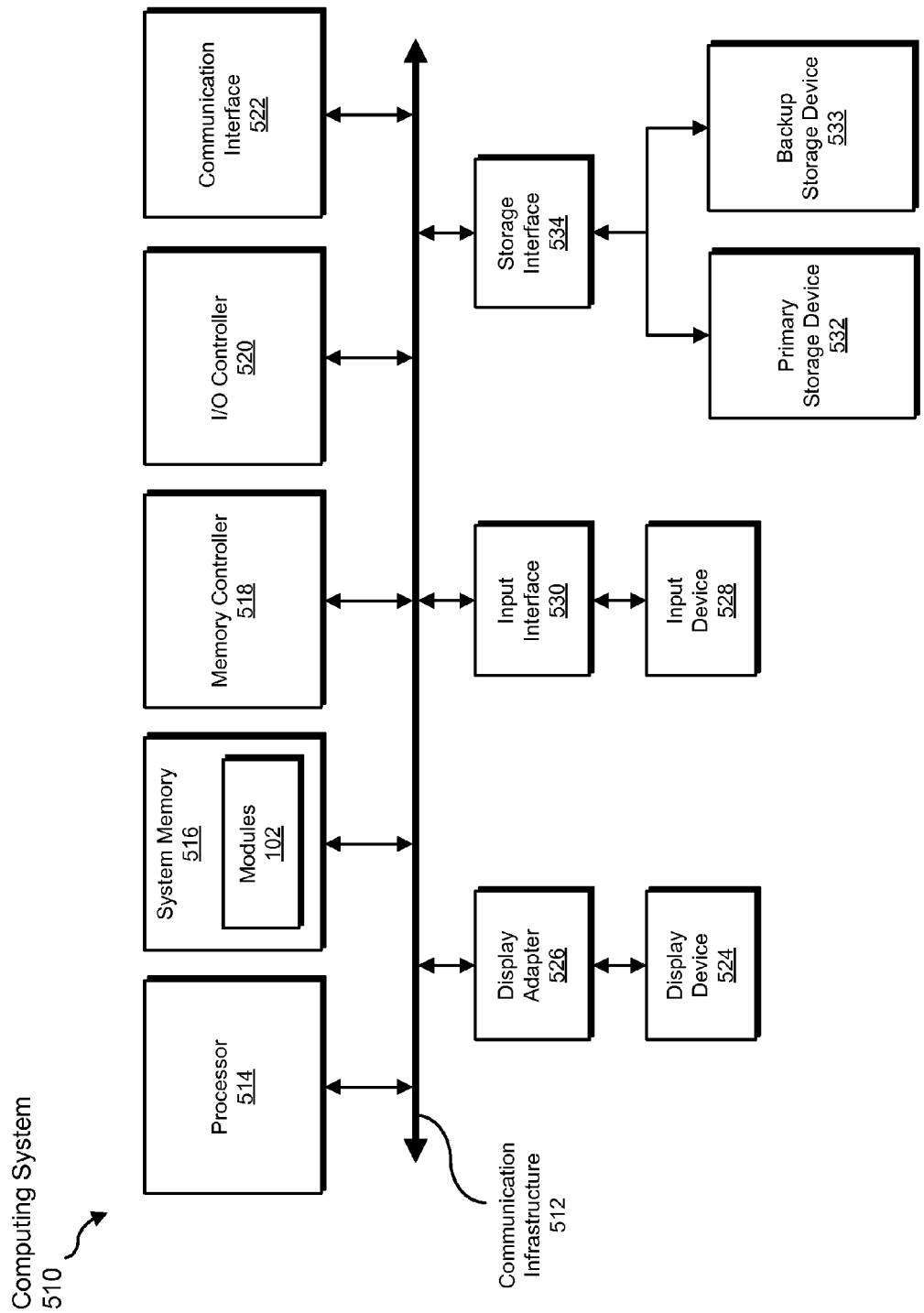
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the identifying, requesting, receiving, directing, determining, blocking, removing, and notifying steps described herein. All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
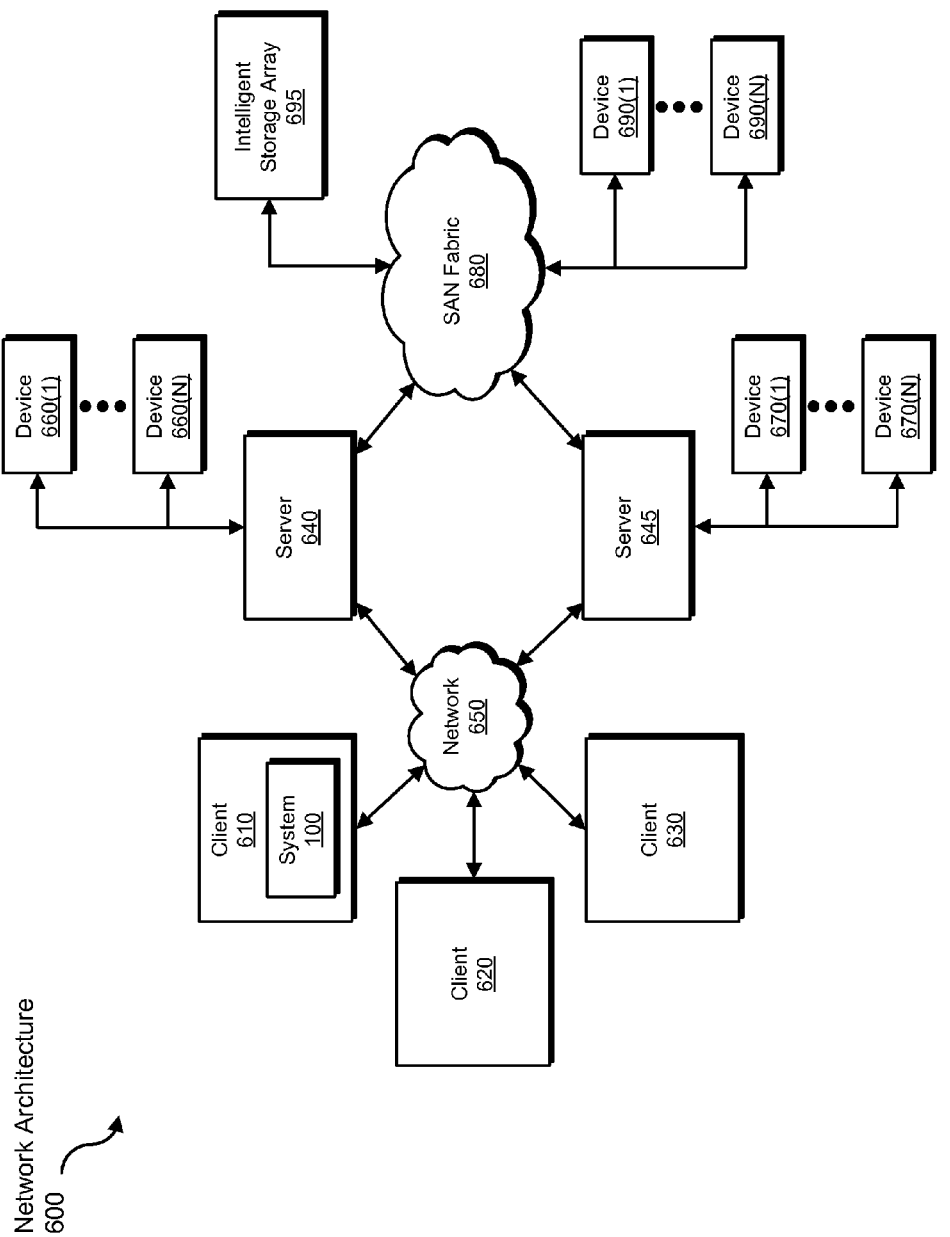
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the identifying, requesting, receiving, directing, determining, blocking, removing, and notifying steps disclosed herein. All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for determining potential impacts of applications on the security of computing systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive information about an application and system components to be transformed, transform the information to information about a potential impact on vulnerability, output a result of the transformation to an application installation event, use the result of the transformation to install or remove an application, and store the result of the transformation to a storage device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for determining potential impacts of applications on the security of computing systems, at least a portion of the method being performed by a computing device comprising at least one processor, the method comprising:

identifying an application subject to a security vulnerability assessment that includes an assessment of how the application may interfere with one or more components of a computing system that may create a vulnerability in the computing system, the one or more components comprising at least one of a hardware component of the computing system or a software component of the computing system;

requesting information that identifies a potential impact of the application on a vulnerability of the computing system to at least one exploit associated with the application by submitting information about the one or more components of the computing system;

receiving the information that identifies the potential impact of the application on the vulnerability of the computing system, wherein:
the information that identifies the potential impact of the application is derived at least in part from a statistical analysis correlating at least one of the one or more components of the computing system with at least one event on at least one additional computing system on which the application has previously been installed;
the event indicates the exploit associated with the application;
one or more components of the additional computing system match at least one of the one or more components of the computing system;
the information that identifies the potential impact is based at least in part on the one or more components of the computing system;

directing a determination about an installation of the application on the computing system based at least in part on the information that identifies the potential impact of the application on the vulnerability of the computing system, wherein:
the installation comprises an automatic update of a previous version of the application to a newer version of the application;
directing the determination about the installation comprises blocking the automatic update of the previous version of the application on the computing system to the newer version of the application.

2. The computer-implemented method of claim 1, wherein identifying the application subject to the security vulnerability assessment comprises receiving, at a security server, a request from a user of the computing system to respond with information regarding whether the application is safe to install and/or or whether installing the application will create a vulnerability on the computing system.

3. The computer-implemented method of claim 1, wherein identifying the application subject to the security vulnerability assessment comprises identifying the application in response to identifying a download of the application to the computing system.

4. The computer-implemented method of claim 1, wherein identifying the application subject to the security vulnerability assessment comprises identifying the application in response to identifying an attempt to automatically update the previous version of the application.

5. The computer-implemented method of claim 1, wherein directing the determination about the installation of the application on the computing system comprises:
   determining, based on the information that identifies the potential impact of the application, that the application will create the vulnerability on the computing system if installed on the computing system;
   blocking the automatic update based at least in part on determining that the application will create the vulnerability.

6. The computer-implemented method of claim 1, wherein identifying the application subject to the security vulnerability assessment comprises identifying an attempted update to the previous version of the application.

7. The computer-implemented method of claim 1, wherein identifying the application subject to the security vulnerability assessment comprises identifying the application by scanning the computing system for a program for installing applications.

8. The computer-implemented method of claim 1, wherein the information that identifies the potential impact of the application is derived at least in part from at least one of:
   events on the additional computing system before the application is installed and/or updated on the additional computing system;
   events on the additional computing system after the application is installed and/or updated on the additional computing system;
   events on the additional computing system after the application is removed from the additional computing system.

9. The computer-implemented method of claim 1, wherein blocking the automatic update comprises quarantining the computing system by installing the application in a virtualization layer of the computing system that overlays a base file system of the computing system, wherein the virtualization layer is managed by a file system filter that redirects calls which are initially directed to locations within the base file system to locations within the virtualization layer.

10. The computer-implemented method of claim 1, wherein the one or more components of the computing system comprise at least one of:
   a processor of the computing system;
   a memory device of the computing system;
   a storage device of the computing system;
   an operating system of the computing system;
   a dynamic-link of the computing system.

11. A system for determining potential impacts of applications on the security of computing systems, the system comprising:
   an identification module programmed to identify an application subject to a security vulnerability assessment that includes an assessment of how the application may interfere with one or more components of a computing system that may create a vulnerability in the computing system, the one or more components comprising at least one of a hardware component of the computing system or a software component of the computing system;
   a requesting module programmed to request information that identifies a potential impact of the application on a vulnerability of the computing system to at least one exploit associated with the application by submitting information about the one or more components of the computing system;
   a receiving module programmed to receive the information that identifies the potential impact of the application on the vulnerability of the computing system, wherein:
      the information that identifies the potential impact of the application is derived at least in part from a statistical analysis correlating at least one of the one or more components of the computing system with at least one event on at least one additional computing system on which the application has previously been installed;
      the event indicates the exploit associated with the application;
      one or more components of the additional computing system match at least one of the one or more components of the computing system;
      the information that identifies the potential impact is based at least in part on the one or more components of the computing system;
   a direction module programmed to direct a determination about an installation of the application on the computing system based at least in part on the information that identifies the potential impact of the application on the vulnerability of the computing system, wherein:
      the installation comprises an automatic update of a previous version of the application to a newer version of the application;
      the direction module directs the determination about the installation by blocking the automatic update of the previous version of the application on the computing system to the newer version of the application;
   at least one hardware processor configured to execute the identification module, the requesting module, the receiving module and the direction module.

12. The system of claim 11, wherein the identification module is programmed to identify the application subject to the security vulnerability assessment by receiving, at a security server, a request from a user of the computing system to respond with information regarding whether the application is safe to install and/or or whether installing the application will create a vulnerability on the computing system.

13. The system of claim 11, wherein the identification module is programmed to identify the application subject to the security vulnerability assessment by identifying the application in response to identifying a download of the application to the computing system.

14. The system of claim 11, wherein the identification module is programmed to identify the application subject to the security vulnerability assessment by identifying the application in response to identifying an attempt to automatically update the previous version of the application.

15. The system of claim 11, wherein the direction module is programmed to direct the determination about the installation of the application on the computing system by:
   determining, based on the information that identifies the potential impact of the application, that the application will create the vulnerability on the computing system if installed on the computing system;
   blocking the automatic update based at least in part on determining that the application will create the vulnerability.

16. The system of claim 11, wherein the identification module is programmed to identify the application subject to the security vulnerability assessment by identifying an attempted update to the previous version of the application.

17. The system of claim 11, wherein the identification module is programmed to identify the application subject to the security vulnerability assessment by identifying the application by scanning the computing system for a program for installing applications.

18. The system of claim 11, wherein the information that identifies the potential impact of the application is derived at least in part from at least one of:
   events on the additional computing system before the application is installed and/or updated on the additional computing system;
   events on the additional computing system after the application is installed and/or updated on the additional computing system;
   events on the additional computing system after the application is removed from the additional computing system.

19. The system of claim 11, wherein:
   the direction module is programmed to block the automatic update by quarantining the computing system by installing the application in a virtualization layer of the computing system that overlays a base file system of the computing system, wherein the virtualization layer is managed by a file system filter that redirects calls which are initially directed to locations within the base file system to locations within the virtualization layer.

20. A non-transitory computer-readable-storage medium comprising one or more computer-readable instructions that, when executed by at least one processor of a computing device, cause the computing device to:
   identify an application subject to a security vulnerability assessment that includes an assessment of how the application may interfere with one or more components of a computing system that may create a vulnerability in the computing system, the one or more components comprising at least one of a hardware component of the computing system or a software component of the computing system;
   request information that identifies a potential impact of the application on a vulnerability of the computing system to at least one exploit associated with the application by submitting information about the one or more components of the computing system;
   receive the information that identifies the potential impact of the application on the vulnerability of the computing system, wherein:
      the information that identifies the potential impact of the application is derived at least in part from a statistical analysis correlating at least one of the one or more components of the computing system with at least one event on at least one additional computing system on which the application has previously been installed;
      the event indicates the exploit associated with the application;
      one or more components of the additional computing system match at least one of the one or more components of the computing system;
      the information that identifies the potential impact is based at least in part on the one or more components of the computing system;
   direct a determination about an installation of the application on the computing system based at least in part on the information that identifies the potential impact of the application on the vulnerability of the computing system, wherein:
      the installation comprises an automatic update of a previous version of the application to a newer version of the application;
      directing the determination about the installation comprises blocking the automatic update of the previous version of the application on the computing system to the newer version of the application.

* * * * *